(No Model.)  3 Sheets—Sheet 1.
J. L. STEWART.
APPARATUS FOR MANUFACTURING GAS.
No. 301,531. Patented July 8, 1884.
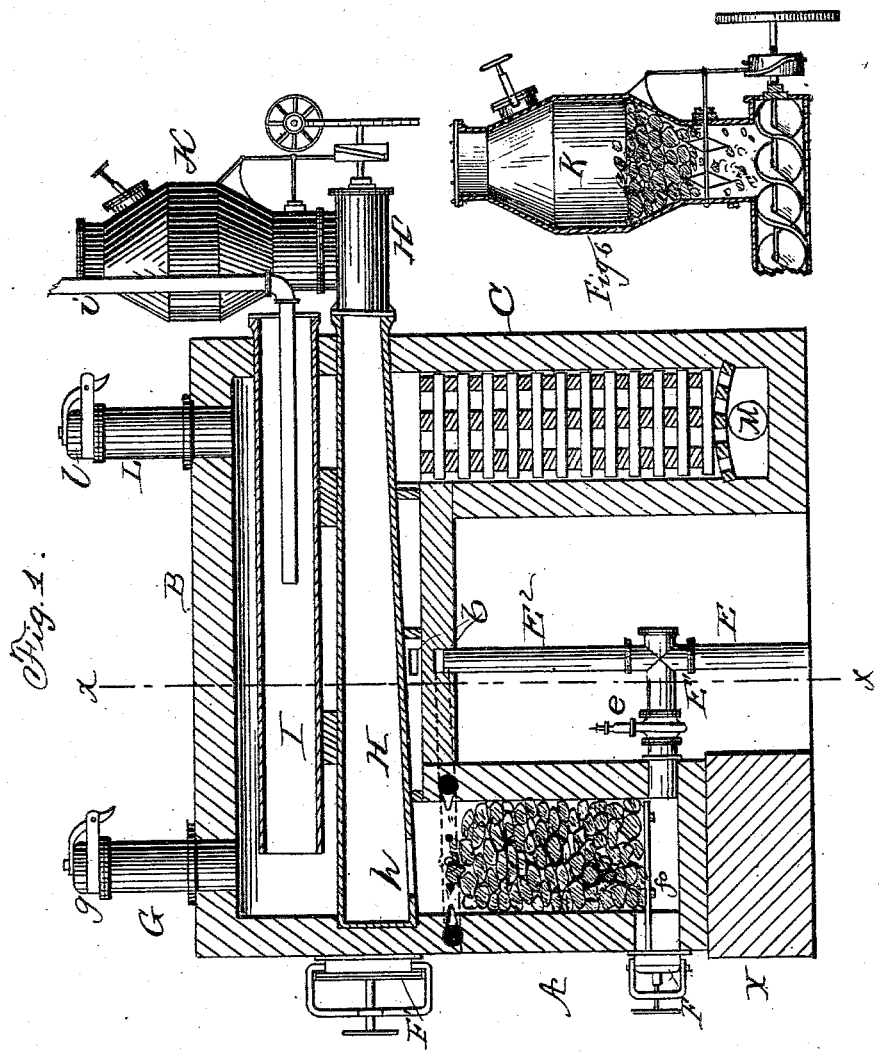

(No Model.) 3 Sheets—Sheet 2.
J. L. STEWART.
APPARATUS FOR MANUFACTURING GAS.
No. 301,531. Patented July 8, 1884.
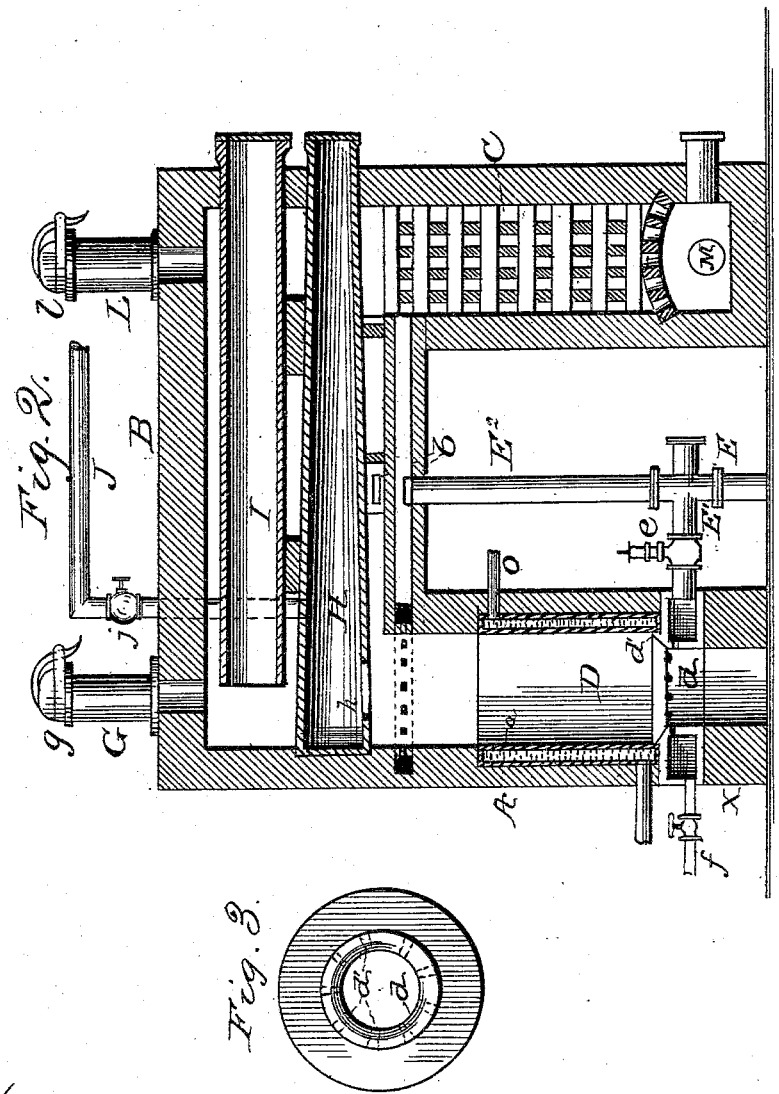
Witnesses
J. W. Reynolds
H. Leo. Duffy
Inventor
John L. Stewart
per O. E. Duff
Atty.

(No Model.) 3 Sheets—Sheet 3.
J. L. STEWART.
APPARATUS FOR MANUFACTURING GAS.
No. 301,531. Patented July 8, 1884.
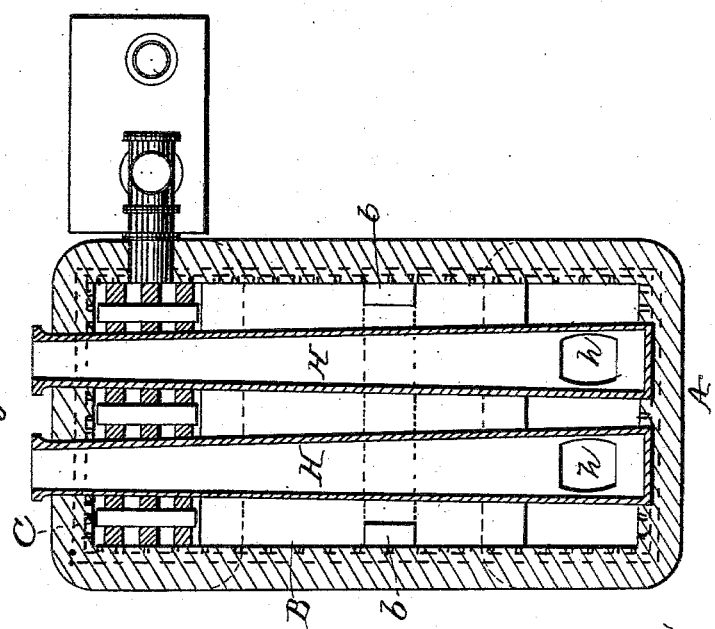
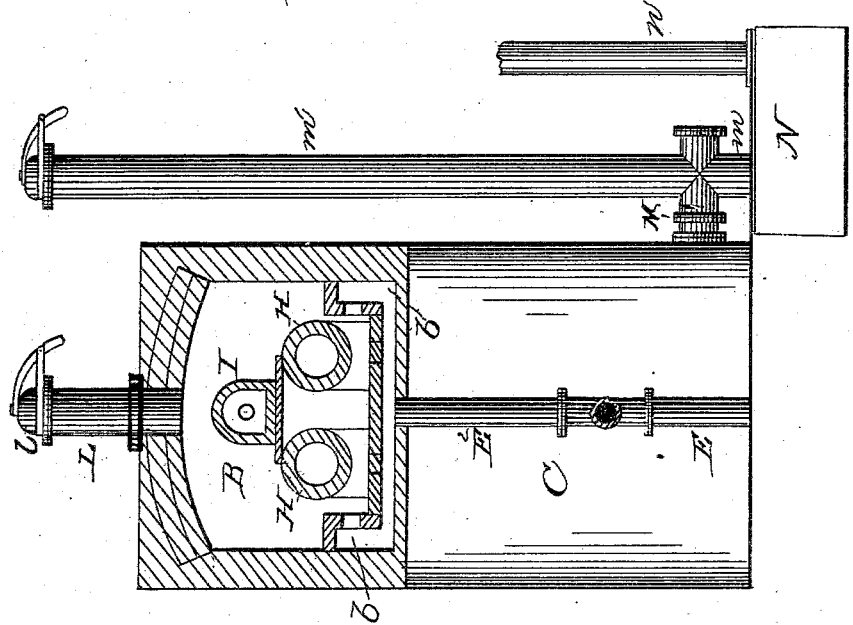
Witnesses:
T. F. Holden
A. Leo. Duffy
Inventor
John L. Stewart
per O. E. Duffy
Atty.

UNITED STATES PATENT OFFICE.

JOHN L. STEWART, OF PHILADELPHIA, PENNSYLVANIA.

APPARATUS FOR MANUFACTURING GAS.

SPECIFICATION forming part of Letters Patent No. 301,531, dated July 8, 1884.

Application filed July 25, 1883. (No model.)

*To all whom it may concern:*

Be it known that I, JOHN L. STEWART, of Philadelphia, in the county of Philadelphia and State of Pennsylvania, have invented certain new and useful Improvements in Apparatus for Manufacturing Gas; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to the manufacture of gas by the decomposition of steam in contact with hot carbonaceous fuel, the distillation of bituminous coal, the vaporization of liquid hydrocarbon, and by combining and fixing the resulting gases and vapors in a heated chamber containing refractory material. The object is to distill the volatile gases from bituminous coal and reduce it to coke before discharging it into the generating and decomposing chamber by the heat of gases and waste products given off from such chamber, and thereby utilize the heat, save the rich carbureted hydrogen from the coal, and prepare hot coke for use in the steam-decomposing chamber. Another object is to produce a compactly-organized apparatus which shall be convenient and economical in operation.

The invention consists, mainly, in the construction and arrangement of parts constituting the apparatus, and the process will be understood from a description of the operation of such apparatus.

The invention is illustrated by the accompanying drawings, forming part of this specification.

Figure 1 represents a vertical longitudinal section of the decomposing and generating chamber, the retorts, and the fixing-chamber, and also the air-supply conduits above the fuel arranged to supply air to the gases at the mouth of the retort. Fig. 2 represents a similar view of the same parts, showing the water-jacket and the annular air and steam inlet box, taking the place of the grate in the decomposing and generating chamber. Fig. 3 represents a top view of the annular air and steam inlet box. Fig. 4 represents a vertical transverse section through the retort-chamber and retorts on the line *x x*. Fig. 5 represents a horizontal section through the retorts and upper portion of the apparatus. Fig. 6 is a vertical section through the feeding device, by which the fuel is agitated and at the same time fed to the furnace, as will more fully hereinafter appear.

The apparatus is composed of three main parts or chambers, A B C, freely communicating with each other, and inclosed by fire-brick walls, which may be covered by jackets of riveted boiler-iron plates in the usual manner. The decomposing and generating chamber A is erected vertically upon a suitable foundation, X, and is preferably provided with an iron water-jacket lining, *a*, extending up as high as the clinkers are liable to form and adhere to a brick-lined decomposing-chamber. This iron water-cooled jacket prevents the adhesion of clinker, and thus saves much time in cleansing the fuel-chamber. The water-jacket rests upon the annular steam and air distributing box D, which is set into the brick walls in about the position usually occupied by the grate. The box D projects into the fuel-chamber below the water-jacket, contracting the area of the chamber at this point and forming a sufficient support for the fuel. The inwardly-projecting portion has a raised beveled top, *d'*, and openings or tuyeres *d* are provided in the inner wall of the box for the admission of steam and air to the fuel. Air is admitted to the box or to the ash-pit below the grate by a pipe, E', having valve *e*, and connecting with the blast-pipe E, and steam is admitted by pipe *f*, having a valve. A tight-fitting door, F, is provided for closing the opening leading into the ash-pit, and another tight-fitting door, F', closes an opening near the top of chamber A, near where the retorts rest in the wall, to afford access to the retorts and for feeding fuel when necessary. A smoke-stack, G, having a tight-fitting lid, *g*, at the top is fitted to the top of chamber A, for taking off the products of combustion when desired. The horizontal retort-chamber B is built between and is supported upon the upright chambers A and C. It opens freely into them at each end and serves to conduct products of combustion and gas from the generating-chamber A to the fixing-chamber C, and for containing the coal and oil retorts. An air-distributing box, $b$, of firebrick or other suitable material, is formed in its bottom and partly up its sides, as shown in Fig. 4. This air-distributer $b$, however, is preferably formed as a flue extending through the side walls near the tops of chambers A and C and near the base of chamber B, as shown in Figs. 2 and 5. The air-pipe $E^2$ connects pipe E with this box and supplies air to support the combustion of gaseous products evolved from chamber A when the air-blast is admitted and the chambers are being heated up. The coal-retorts H rest at their front ends in the outer wall of chamber C, and, passing through chamber B, are supported on firebrick blocks therein, and at their extreme ends rest in the outer wall of chamber A. They may be constructed of iron or clay, and are formed with gradually-increasing diameters from their front to their rear ends, to give free passage to the coke formed from the coal passed into and through them, and at their rear ends they are provided with openings $h$, for the discharge of coke into chamber A. At their front ends they are provided with mouth-pieces H', and feeding or charging apparatus K, which is provided with an agitating device for loosening the feed, and a feed-screw. (Clearly shown by Fig. 6.) A pipe, J, connects with the coal-retort a short distance back of its opening $h$, and at its outer end connects with an exhauster (not shown) for the purpose of drawing off the coal-gas in that direction, when desired. Above the retorts H a hydrocarbon-oil retort, I, is set projecting through the front wall of chamber C, and open at its rear end, and provided with an inlet oil-pipe, $i$, projecting into it through its front end. At the top of chamber C a smoke-stack, L, having a tight-fitting cap, $l$, is provided. The chamber C is filled with regenerator brick-work resting upon an open-work arch near the bottom. Below the arch the eduction gas-pipe M connects, which has a branch, $m$, extending down into the seal box or washer N, and a branch, $m'$, projecting above the top of the furnace where its end is provided with a tight-fitting lid, $o$. This branch serves as a smoke-stack. A pipe, $n$, rises from the box N, for conducting away the gas to be stored.

The operation of manufacturing gas is conducted as follows: Fire is first kindled in generating-chamber A and the air-blast is admitted till a body of fuel several feet thick, which is gradually fed into the chamber, is raised to an incandescent temperature, or thereabout, and at this time the lid $o$ of stack $m'$ is open, and air is also admitted to the air-distributing box $b$, for producing complete combustion of the gaseous products from chamber A around the retorts. The resulting hot products of combustion are passed down through the brick-work in the combining and fixing chamber, where the heat is stored. Coke or anthracite coal is preferably used in starting the fire in the generating-chamber. During the period of heating up the chambers, or about the time the chambers are heated, bituminous coal, preferably in small form, is fed into the retorts from the hoppers by conveying-screws in the mouth-pieces of the retorts, such as are shown in Fig. 6, and described in a separate application for patent. The chambers being heated and the charging of the retorts with coal having been started, or before such charging is commenced, the air-blast is shut off, the ash-pit closed, and the lids at the top of the smoke-stacks tightly closed. Steam is then admitted at the base of the fuel, preferably through the annular box D, and decomposed by passage through the incandescent fuel into hydrogen and carbonic oxide. At the same time the feeding of bituminous coal into and through the retorts is proceeded with, and the rich carbureted hydrogen distilled therefrom is passed out through openings $h$, where it mingles with the gases resulting from the decomposed steam. Hydrocarbon oil is also admitted by pipe $i$ into retort I, where it is vaporized and partially decomposed, and the resulting gases and vapors pass out at the rear end of the retort and mingle with the other gases. All the gases and vapors pass through chamber B around the retorts, imparting their heat to the advancing coal, and thence into the fixing-chamber C, where they are combined and converted into a fixed gas. The completed gas passes through pipes M $m$ into the washer and seal-box N, from which it passes to the purifier and holder, or to a place of immediate use. The manufacture of gas is continued till the temperature of the chambers is reduced too low, when the steam is shut off, the oil is shut off, the smoke-stack $m'$ opened, and the air-blast again admitted till the chambers are reheated. The feeding of the coal forward in the retorts may be continued during the application of the blasts, in order to discharge the coke formed into chamber A. The chambers are quickly reheated, after which the manufacture of gas is resumed, as above described. The coke resulting from the distillation of coal in the retorts is sufficient to maintain a bed of fuel in chamber A, and is discharged into such chamber hot, so that it is quickly raised to incandescence when the air-blast is applied.

By the above method of operation good results are secured; but without a separate eduction-pipe for gas from the coal-retorts it is evident that part of the hydrocarbon gas evolved from the coal would be burned at the time the air-blast is being admitted for raising the decomposing and fixing chambers to the proper heat. In order to save such hydrocarbon gas, the valve of eduction-pipe J is opened and the gas is drawn off by an exhauster so run that but slight or no vacuum is produced in the retort, so that little or no furnace-gas is drawn through the retort and eduction-pipe. All the coal-gas may be drawn off in this manner, or it may be drawn off only during the period that the air-blast is being admitted to the furnace. As the coal is gradually fed forward and reduced to coke, it becomes more and more highly heated till it is at or near incandescence at opening $h$, and the hydrocarbon vapors consequently that are generated at or near the front end of the retort are converted into fixed gas in passing back through the heated coal and coke to the eduction-pipe, so that it is not necessary to pass it through fixing-chamber C, but may be drawn, as described, through pipe J and passed either with the other gases of the producer to the purifiers and holder, or passed separately to purifiers and holder, as found most desirable. By drawing off the coal-gas separately it may all be saved and the volume of rich gas thus increased. If, however, it is desirable to have the hydrocarbon gas from the retorts commingle with the water-gas and oil-vapors from the oil-retort and pass together through the fixing-chamber, while water-gas from the decomposition of steam is being produced in the generator, then the exhauster need only to be stopped during the making of the gas and started up again when the air-blast is let on to heat up the fuel in the generator to the proper temperature, so that while the fire is being blown up and the combustion of the waste products are coking the coal in the retorts and heating the fixing-chamber, by a slight vacuum in pipe J all the hydrocarbon gas can be conducted off and saved without drawing in any of the waste products of combustion.

Having described my invention, what I claim, and desire to secure by Letters Patent, is—

1. The gas-producing apparatus consisting of the decomposing and generating chamber A, the horizontal retort-chamber B, and retorts H H, the fixing-chamber extending below the retort-chamber and containing regenerator brick-work, and connecting-pipes for supplying air and steam and conducting away the products of combustion and gases, all combined and operating as described.

2. In combination with the generating-chamber, the removable metallic air and steam distributing box D, having passages $d$ set into the brick-work and projecting into the fuel-chamber, and contracting its area at its junction with the ash-pit, and the connected air and steam supply pipes.

3. The air and steam distributing box projecting internally within the fuel and generating chamber, having a beveled rim, $d'$, the perforations $d$, and the connected air and steam supply pipes, in combination with the generating-chamber.

4. The combination of the generating-chamber, the air and steam distributing box constructed and set as described, and the water-jacket set in the walls of the generator above the distributing-box, as and for the purpose described.

5. The horizontal retort-chamber D, provided with the perforated air-distributing box $b$, and the connecting air-supply pipe, in combination with the generating-chamber at one end, and the fixing-chamber at the other end, and suitable connecting-pipes, as described.

6. In combination with the chambers A, B, and C, arranged as described, the coal-retorts having openings $h$ in their rear ends, and passing through the front wall of chamber C, through chamber B, and resting in the outer wall of chamber A, as and for the purpose described.

7. In combination with generating-chamber A, retort-chamber B, and fixing-chamber C, connected and arranged as described, the liquid-hydrocarbon retort I, passing through chamber B, and open at its rear end, and having an oil-supply pipe, whereby oil vapor and gas generated in the retort are carried by water-gas from chamber A into the fixing-chamber.

In testimony that I claim the foregoing as my own I affix my signature in presence of two witnesses.

JOHN L. STEWART.

Witnesses:
O. E. DUFFY,
CHARLES P. WEBSTER.